UNITED STATES PATENT OFFICE.

CYRUS ROBERTS, OF THREE RIVERS, MICHIGAN.

CAR-WHEEL.

SPECIFICATION forming part of Letters Patent No. 429,963, dated June 10, 1890.

Application filed March 24, 1890. Serial No. 345,123. (No model.)

*To all whom it may concern:*

Be it known that I, CYRUS ROBERTS, a citizen of the United States, residing at Three Rivers, in the State of Michigan, have invented certain new and useful Improvements in Car-Wheels, of which the following is a specification, reference being had therein to the accompanying drawings.

This invention relates to new and useful improvements in the construction of car-wheels especially designed for railway hand-cars, velocipedes, and other like vehicles. This class of wheels not only require to combine lightness with strength, as the vehicle to which they are applied has to be lifted on and off the track to get out of the way of passing trains, but they are also required to be free from creating much noise, as otherwise the men in charge of these vehicles are prevented from hearing the sounds of approaching trains, to the imminent danger of their lives. Without combining these three requisites car-wheels of the above description are of little practical value; and it is the object of my invention to obtain these in my improved construction by the means and in the manner hereinafter more fully described, and shown in the annexed drawings, in which—

Figure 1 is a vertical central cross-section of my improved car-wheel, and Fig. 2 is a vertical section in the plane of the wheel on line $x\ x$ in Fig. 1.

My improved car-wheel belongs to that class in which the tire is formed of rolled metal; and my invention especially consists in the peculiar construction and arrangement of the tire, the body of the wheel being of known construction and consisting of a metal hub A, wooden spokes B, secured in spoke-sockets formed in the hub, and a wooden rim C, secured to the outer end of the spokes and composed of fellies in the usul way of forming such rims.

This wheel is provided with two tires of rolled metal, one upon the other. The under tire D has the flange E of the wheel integrally formed thereon. It is preferably made smaller than the width of the felly, and an annular offset E', equal to the thickness of the tire, is formed on the rim of the wheel to receive this tire, which is made to firmly abut against the shoulder F of the offset. The outer tire is the full width of the rim and forms the tread of the wheel, and at the same time securely holds the inner tire in place, and by abutting with its outer edge G against the flange of the wheel braces it at the point where it is most liable to break. The inner tire, being firmly held between the outer tire and the rim of the wheel, re-enforces the rim of the wheel and the outer tire just where the wheel makes its impact with the rail and where it naturally suffers the most wear and tear.

On the outer edge of the flange of the wheel a nosing H is formed by turning over the edge and doubling it upon itself, for a purpose hereinafter described.

The parts being constructed and arranged as shown and described, I will now proceed to describe the reasons therefor and the advantages sought to be derived therefrom as compared with the present state of the art.

I am aware that rolled tires have been employed heretofore; but in the construction of this particular class of wheels the tire was always made integral in one piece, with flanges on both edges. This was done with a suitable forming-machine; but in cooling the tire after it was formed some parts would cool faster than others, and when cold the tire was more or less out of round, and as a flanged tire of this description cannot be shrunk onto the wheel the latter has to be pressed into the tire. This makes at best a poor job, as the flanged tire cannot give any on account of its flanges, and the wood when forced into contact with the inner face of the tire is often mashed and thereby weakened, while at some points the wood did not make contact with the tire at all, and the tire, being necessarily light, a wheel constructed in this manner soon gives out under the use to which it is put.

My construction does not require more metal than in the old way of constructing, and besides the metal is applied to better advantage, as the inner tire strengthens the (No Model.)
A. A. SAWYER.
LISTER CULTIVATOR.
No. 429,964. Patented June 10, 1890.
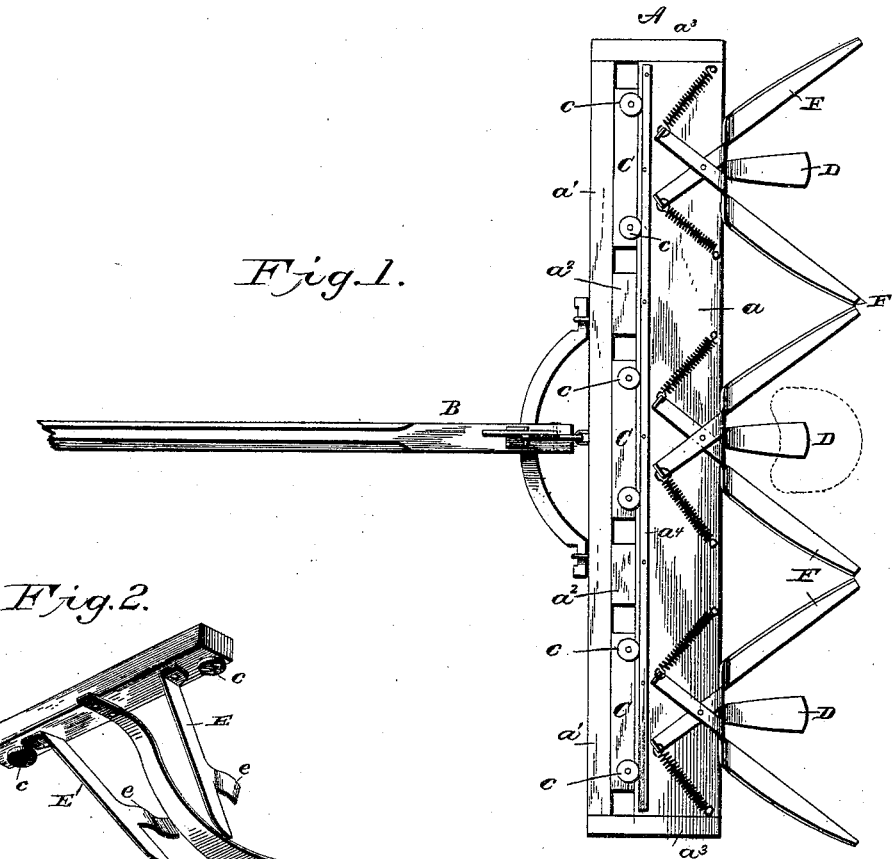

In my improved construction the tires can be shrunk on without trouble, and a good solid wheel is the result, which has none of the inherent weakness of the wheel made by the method of pressing the wheel into the tire.